(12) United States Patent
Burt et al.

(10) Patent No.: US 8,931,601 B2
(45) Date of Patent: Jan. 13, 2015

(54) DAMPENING DEVICE

(75) Inventors: Jonathan P. Burt, Sturbridge, MA (US); James Jones, Palm City, FL (US); Steven J. Bauer, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 848 days.

(21) Appl. No.: 12/940,744

(22) Filed: Nov. 5, 2010

(65) Prior Publication Data

US 2012/0112394 A1    May 10, 2012

(51) Int. Cl.
*F16D 63/00* (2006.01)
*F16F 7/10* (2006.01)
*F16F 15/02* (2006.01)
*F16F 9/34* (2006.01)

(52) U.S. Cl.
CPC .................. *F16F 15/021* (2013.01); *F16F 9/34* (2013.01)
USPC ............................................. 188/80; 188/378

(58) Field of Classification Search
CPC ...... F16D 65/02; F16D 65/028; B65G 13/075
USPC ......... 267/136; 188/80–85, 378–381; 384/50, 384/54, 56, 57
See application file for complete search history.

(56) References Cited

U.S. PATENT DOCUMENTS

| | | | |
|---|---|---|---|
| 2,854,075 A * | 9/1958 | Stevens ........................... | 83/298 |
| 3,572,860 A | 3/1971 | Hart et al. | |
| 3,696,891 A * | 10/1972 | Poe ................................ | 188/268 |
| 3,733,753 A * | 5/1973 | Miller et al. ................... | 451/152 |
| 4,091,907 A * | 5/1978 | Tabler ........................... | 193/35 A |
| 5,040,643 A * | 8/1991 | Chapman et al. ............. | 188/134 |
| H1317 H | 6/1994 | Ng | |
| 5,660,256 A | 8/1997 | Gallmeyer et al. | |
| 5,977,677 A | 11/1999 | Henry et al. | |
| 6,092,987 A | 7/2000 | Honda et al. | |
| 6,227,337 B1 * | 5/2001 | Bernhardt et al. ............. | 188/80 |
| 6,450,693 B1 | 9/2002 | Fuchs et al. | |
| 7,243,894 B2 | 7/2007 | Haregoppa et al. | |
| 7,658,127 B2 | 2/2010 | Crist | |
| 2009/0273258 A1 | 11/2009 | Aiello | |
| 2012/0067024 A1* | 3/2012 | Vauchel ....................... | 60/226.2 |

* cited by examiner

*Primary Examiner* — Vishal Sahni
(74) *Attorney, Agent, or Firm* — Kinney & Lange, P.A.

(57) ABSTRACT

An assembly for dampening vibration movement between a cylinder and a concentric duct, where the cylinder is positioned radially inside the duct, includes a damper attached to the duct. The damper includes a housing attached to the duct, a contact member positioned at least partially inside the housing and having a contact surface adjacent an outer surface of the cylinder, and a cap threadedly engaged with the housing for applying a load on the contact member in a direction toward the cylinder.

14 Claims, 5 Drawing Sheets

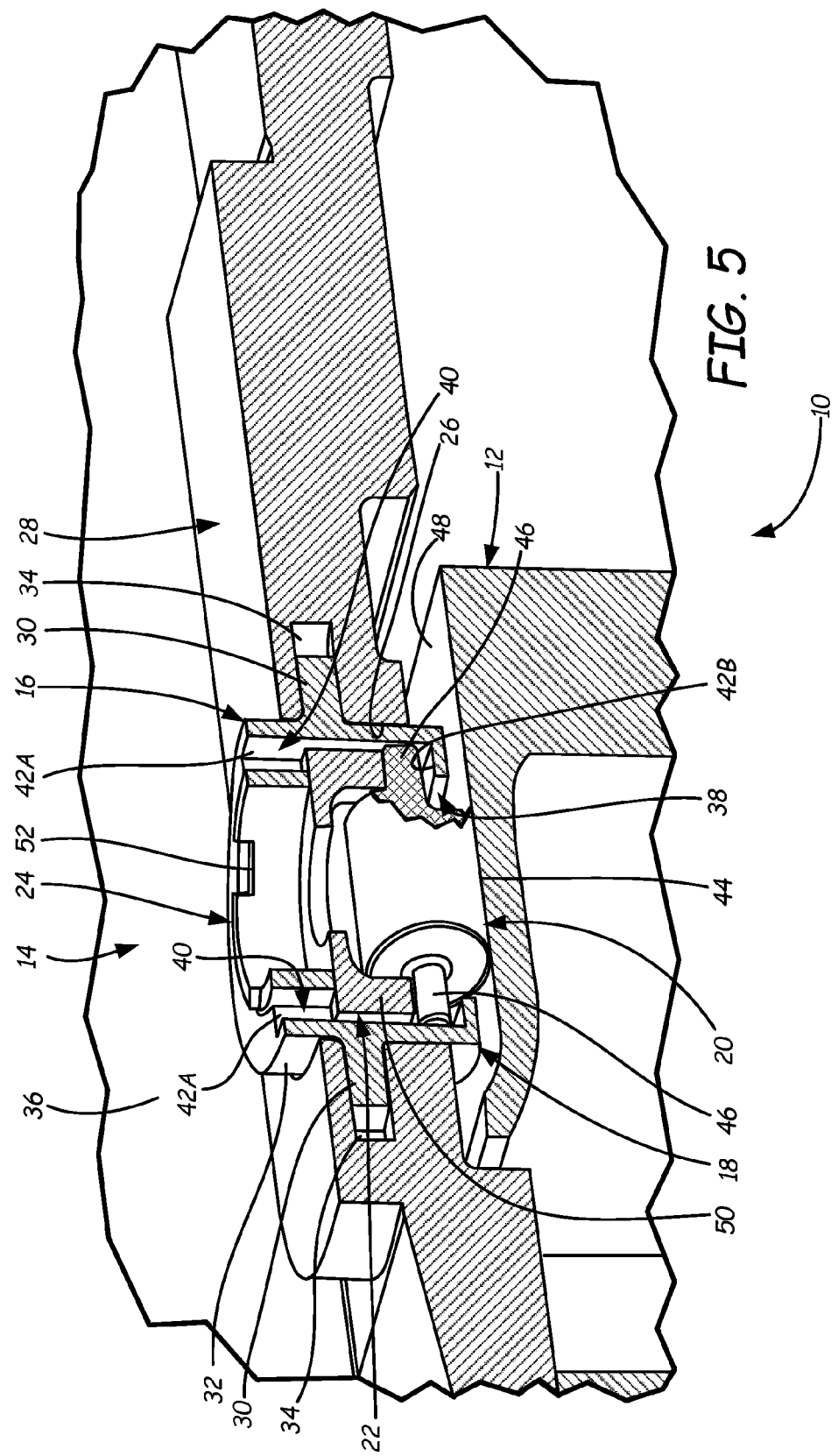

DAMPENING DEVICE

STATEMENT OF GOVERNMENT INTEREST

The U.S. Government has a paid-up license in this invention and the right in limited circumstances to require the patent owner to license others on reasonable terms as provided for by the terms of Contract No. N0019-02-C-3003 awarded by the United States Navy.

BACKGROUND

The present invention relates to dampers, and in particular, to dampers for rotatable bodies. Various components for machines such as fans, gas turbine engines, and other systems used on aircraft or elsewhere can experience undesirable vibrations. A particular component can have one or vibrating more modes, or harmonics, that would be excited by conditions the component is expected to experience during operation. Such vibration can undesirably cause the vibrating component, or other components in the machine, to operate incorrectly or even fail completely.

Various techniques can be used to dampen modal vibrations. However, in applications where space is limited and adding mass is undesirable, it can be difficult to suitably dampen the vibrations within the space limitations without hindering performance of the vibrating component in particular or of the machine in general. This problem can be especially difficult when the vibrating component is a body that rotates, such as a cylinder.

SUMMARY

One embodiment of the present invention includes an assembly for dampening vibration movement between a cylinder and a concentric duct. The cylinder is positioned radially inside the duct and a damper is attached to the duct. The damper includes a housing attached to the duct, a contact member positioned at least partially inside the housing and having a contact surface adjacent an outer surface of the cylinder, and a cap threadedly engaged with the housing for applying a load on the contact member in a direction toward the cylinder.

Another embodiment of the present invention is a method for damping vibrations of a rotatable cylinder. The method includes positioning a cylinder inside and rotatable with respect to a duct, positioning a damper housing in a hole in the duct, attaching the damper housing to the duct, positioning a damper contact member at least partially inside the damper housing, and loading the damper contact member to provide a vibration damping force against an outer surface of the cylinder.

BRIEF DESCRIPTION OF THE DRAWINGS

FIG. 5 is a schematic cross-sectional perspective view of an assembly including a cylinder, a duct, and a damper with a plate of the damper integrally formed with the duct.

DETAILED DESCRIPTION

Figure 1:
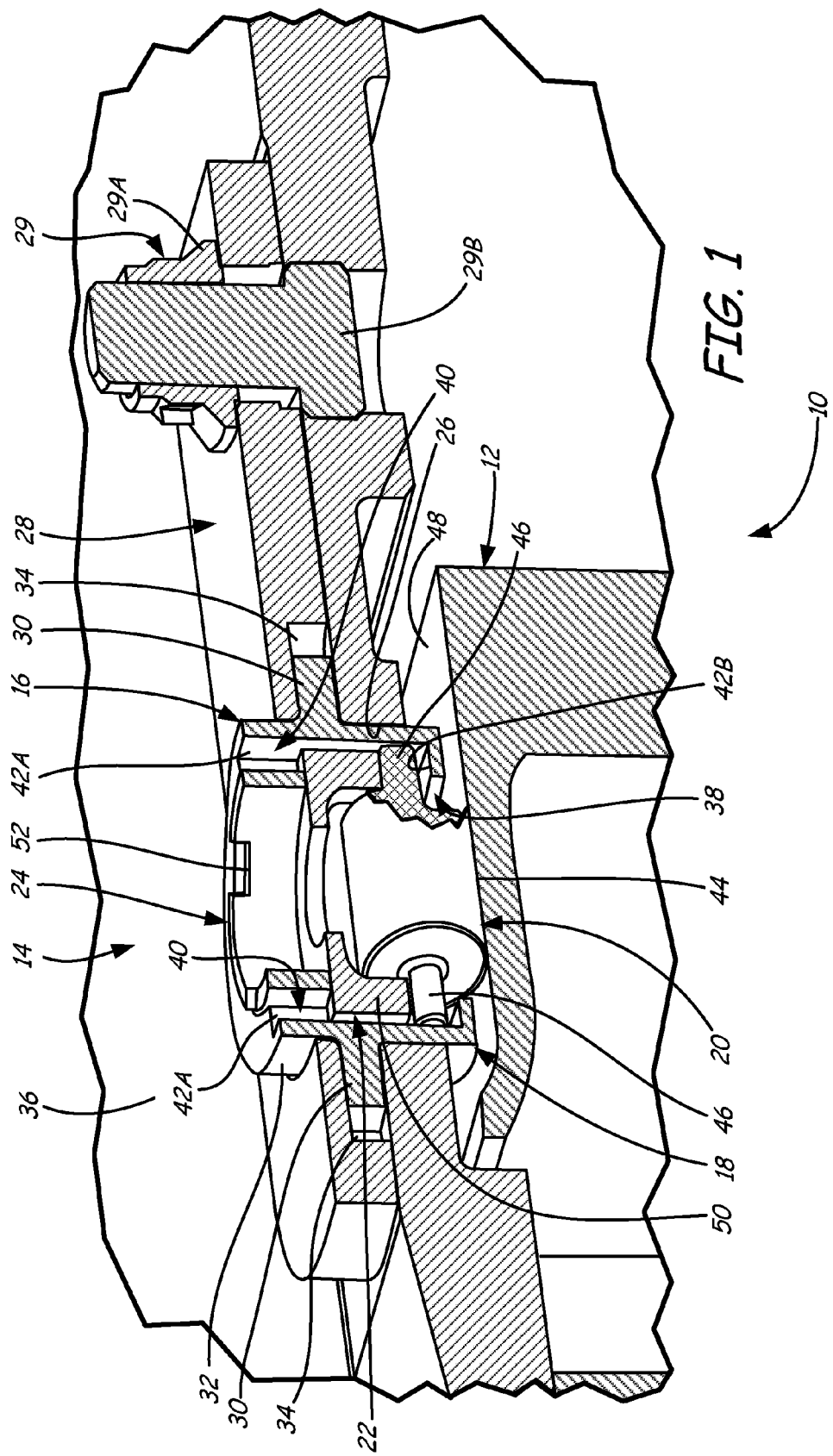
FIG. 1 is a schematic cross-sectional perspective view of an assembly including a cylinder, a duct, and a damper.

FIG. 1 is a schematic cross-sectional view of assembly 10 which includes cylinder 12, duct 14, and damper 16. Cylinder 12 is concentric with, positioned radially inside, and rotatable with respect to duct 14. In the illustrated embodiment, cylinder 12 is a fan duct blocker for use on a short take-off and vertical landing aircraft. In other embodiments, cylinder 12 can be virtually any cylinder that is rotatable with respect to an outer structure, such as duct 14, and that benefits from damping of modal vibrations. Damper 16 (which includes housing 18, roller 20, carriage 22, and cap 24) is positioned in hole 26 of duct 14 for damping anticipated modal vibrations of cylinder 12. Plate 28 attaches damper 16 to duct 14 using connector 29. In the illustrated embodiment, connector 29 includes nut 29A threaded on bolt or stud 29B.

In the illustrated embodiment, housing 18 has tabs 30 extending from its substantially cylindrical outer surface 32. Tabs 30 are positioned in slots 34 of plate 28 to hold housing 18 rigid with respect to duct 14. Plate 28 is attached to outer surface 36 of duct 14 to hold housing 18 in place. In alternative embodiments, plate 28 and/or housing 18 can be integral with duct 14. FIG. 5, for example, shows an embodiment in which plate 28 is integrally formed with duct 14.

Housing 18 has inner surface 38, which is also substantially cylindrical. Slots 40 extend along a length of inner surface 38 from open end 42A to closed end 42B. Roller 20 (shown in partial cross section in FIG. 1) is a contact member with a substantially cylindrical contact surface 44 and substantially cylindrical pins 46 extending from each end. Roller 20 is positioned inside housing 18 with pins 46 positioned in slots 40 to align a rotational axis of roller 20 to be substantially parallel with a rotational axis of cylinder 12. Contact surface 44 of roller 20 extends outside of housing 18 to contact outer surface 48 of cylinder 12. Thus, roller 20 can roll as cylinder 12 rotates in either direction. Roller 20 can be sized to be large enough to limit contact stresses between contact surface 44 and outer surface 48, while still small enough to allow damper 16 to fit in a location with relatively small space limitations. Carriage 22 is also positioned inside housing 18 with posts 50 positioned in slots 40. Posts 50 are in contact with pins 46. Cap 24 is threadedly engaged with inner surface 38 of housing 18 for applying a load to carriage 22, which is transmitted to roller 20, in a direction toward cylinder 12. Cap 24 has notches 52. A tool (not shown) can be inserted into notches 52 to turn cap 24 with respect to housing 18. As cap 24 is turned, it is threaded into housing 18 which pushes carriage 22 against roller 20 in a direction away from cap 24 and toward cylinder 12. Thus, turning cap 24 adjusts an amount of force between contact surface 44 of roller 20 and outer surface 48 of cylinder 12. Damper 16 can be preloaded with a certain force chosen so as to dampen radial deflections from modal vibrations that are expected during operation. Actual forces experienced by damper 16 during modal vibration can be greater and less than the preload force. Duct 14 can be stiff yet still flexible to allow damper 16 to move with and dampen oscillations of cylinder 12. Duct 14 can, thus, act as a spring in combination with damper 16. One or more dampers 16 can be positioned around cylinder 12 to dampen expected modal vibrations and reduce radial deflections caused by those vibrations.

Figure 2:
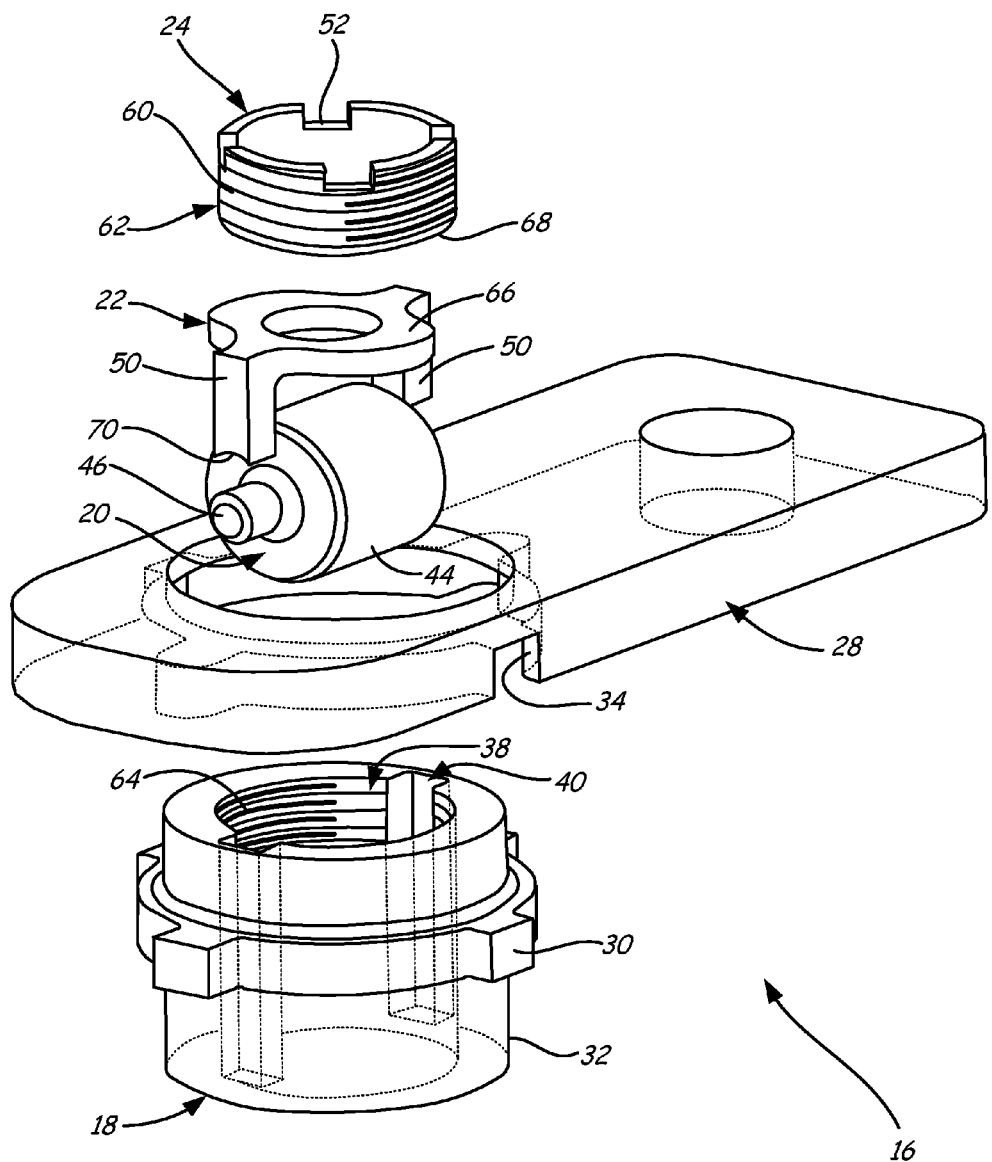
FIG. 2 is an exploded schematic perspective view of the damper of FIG. 1.

FIG. 2 is an exploded schematic perspective view of damper 16. FIG. 2 shows cap 24 having threads 60 on its substantially cylindrical outer surface 62. Housing 18 has threads 64 on its substantially cylindrical inner surface 38. Threads 60 and 64 mate to allow cap 24 to be threaded into housing 18.

Carriage 22 has top surface 66 sized to contact bottom surface 68 of cap 24. Carriage 22 and cap 24 each have substantially hollow interiors to reduce their respective masses. The overall shape of carriage 22 is designed to have a relatively small mass while still transmitting load from cap 24 to pins 46 of roller 20 in a suitable manner. In alternative embodiments, cap 24 and carriage 22 can have different shapes suitable for a particular application.

Carriage 22 has curved partial bushings 70 at ends of each of its posts 50. When assembled, partial bushings 70 are adjacent pins 46 of roller 20. Partial bushings 70 and/or pins 46 can have a coating with a relatively low coefficient of friction. Such a coating can be applied to contact surface 44 of roller 20, slots 40 of housing 18, and/or other surfaces as well.

Figure 3:
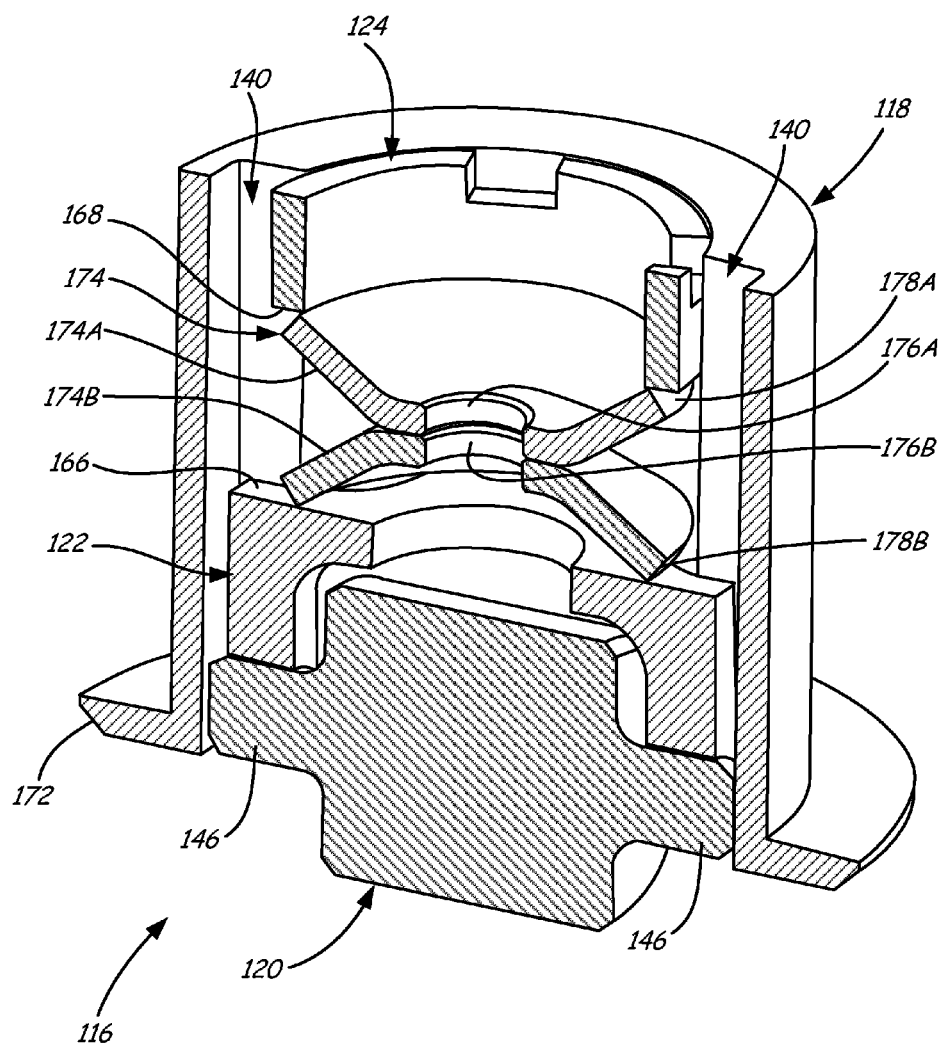
FIG. 3 is a schematic cross-sectional perspective view of a first alternative embodiment of the damper of FIGS. 1 and 2.

FIG. 3 is a schematic cross-sectional perspective view of damper 116. Damper 116 is an alternative embodiment of damper 16 (shown in FIGS. 1 and 2). Roller 120, carriage 122 and cap 124 are substantially similar to roller 20, carriage 22 and cap 24, respectively, of FIGS. 1 and 2. Housing 118 is similar to housing 18 (shown in FIGS. 1 and 2) except housing 118 has flange 172, which can attach housing 118 to duct 14 (shown in FIG. 1) with or without a separate instrument plate, such as plate 22 (shown in FIGS. 1 and 2).

Spring 174 is positioned in housing 118 between cap 124 and carriage 122. In the illustrated embodiment, spring 174 is a Belleville washer spring with first and second Belleville washers 174A and 174B. Each Belleville washer 174A and 174B has a substantially frusto-conical shape with inner edges 176A and 176B and outer edges 178A and 178B, respectively. Outer edge 178A contacts bottom surface 168 of cap 124. Inner edges 176A and 176B contact each other. Outer edge 178B contacts top surface 166 of carriage 122. Spring 174 transmits load from cap 124 to carriage 122, thus biasing roller 120 in a direction toward cylinder 12 (shown in FIG. 1). Pins 146 of roller 120 can slide within the slots 140 of housing 118 when spring 174 compresses. Spring 174 can be stiff yet still flexible to allow carriage 122 and roller 120 to move with and dampen oscillations of cylinder 12. In other embodiments, spring 174 can be another type of spring suitable for the application.

Figure 4:
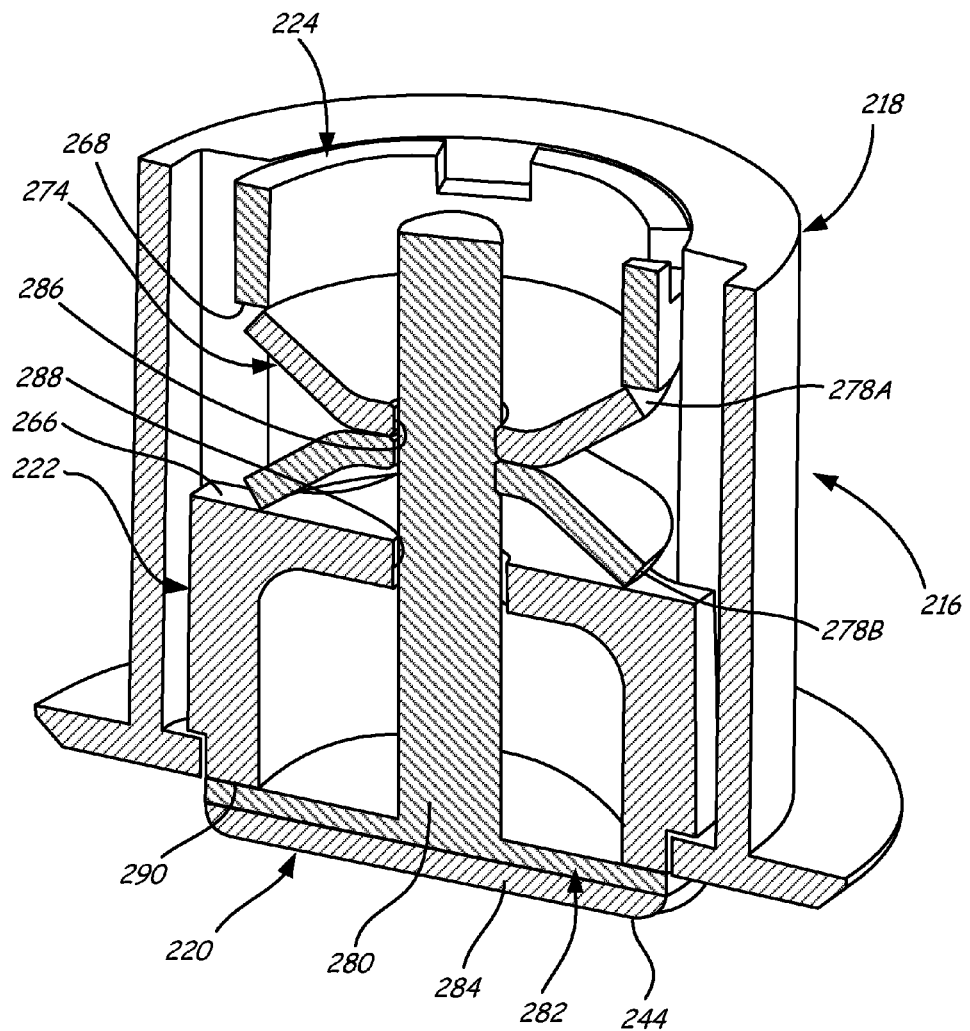
FIG. 4 is a schematic cross-sectional perspective view of a second alternative embodiment of the damper of FIGS. 1 and 2.

FIG. 4 is a schematic cross-sectional perspective view of damper 216. Damper 216 is an alternative embodiment of damper 116 (shown in FIG. 3). Cap 224 and spring 274 are substantially similar to cap 124 and spring 174, respectively, of FIG. 3. Roller 120 (shown in FIG. 3), however, is replaced with contact member 220 which includes pin 280 and contact pad 282. Contact pad 282 has contact surface 244, which is a relatively low friction surface that slides against outer surface 48 of cylinder 12 (shown in FIG. 1). In the illustrated embodiment, contact pad 282 has fibroid layer 284 providing a relatively low coefficient of friction for contact surface 244. In alternative embodiments, contact surface 244 can instead have a coating with a relatively low coefficient of friction. Pin 280 extends through holes 286 and 288 in spring 274 and carriage 222, respectively. One or both of holes 286 and 288 can be sized to provide support for pin 280.

Carriage 222 transmits load from cap 224 and spring 274 to contact member 220, biasing contact member 220 in a direction toward cylinder 12 (shown in FIG. 1). Outer edge 278A of spring 274 contacts bottom surface 268 of cap 224. Outer edge 278B of spring 274 contacts top surface 266 of carriage 222. Instead of using partial bushings 70 (shown in FIG. 2), carriage 222 has surface 290 in contact with and pushing against contact pad 282. Spring 274 transmits load from cap 224 to carriage 222, thus biasing contact member 220 in a direction toward cylinder 12 (shown in FIG. 1). Spring 274 can be stiff yet still flexible to allow carriage 222 and contact member 220 to move with and dampen oscillations of cylinder 12. In other embodiments, spring 274 can be another type of spring suitable for the application.

Carriage 222 and contact member 220 move together as cylinder 12 vibrates. In this embodiment, carriage 222 acts as a spacer between spring 274 and contact member 220. In alternative embodiment, one or more additional spacers can be added between various components. In the illustrated embodiment, carriage 222 and contact member 220 are separate pieces. In alternative embodiments, carriage 222 can be integrally formed with contact member 220. Housing 218 is substantially similar to housing 118 (shown in FIG. 3), except housing 218 has shoulders 292 for containing carriage 222 inside housing 218.

Dampers 16, 116, and 216 can provide a reliable solution to dampen modal vibrations of cylinder 12, yet still allow cylinder 12 to rotate with respect to duct 14. Dampers 16, 116, and 216 use the elasticity of duct 14 and/or one of springs 174 or 274 to provide the damping force as cylinder 12 vibrates. Cylinder 12 can rotate because dampers 16, 116, and 216 have a contact member that either rolls (as with rollers 20 and 120) or slides (as with contact member 220) as cylinder 12 rotates. Dampers 16, 116, and 216 are compact so as to require relatively little space and have relatively little mass. This benefits applications where space is a premium and low mass is desirable.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, features of one embodiment (such as a flange, spring, etc.) can be combined with features of another embodiment to create a damper suitable for a particular application. Moreover, the shape and size of each component can be varied to suit a particular application.

The invention claimed is:

1. A duct assembly comprising:
   a duct;
   a cylinder positioned radially in an interior of the duct, the cylinder being rotatable with respect to the duct; and
   a damper assembly for dampening vibration movement of the cylinder, the damper assembly comprising:
      a plate rigidly attached to the duct, the plate having an aperture extending therethrough that allows access through a hole of the duct to the interior of the duct;
      a housing attached to the plate and at least partially inside the aperture of the plate, the housing having a height extending at least partially through the aperture of the plate in a first direction perpendicular to an axis of the duct, and being at least partially positioned within the duct;
      a contact member positioned at least partially inside the housing and having a contact surface adjacent an outer surface of the cylinder; and
      a cap threadedly engaged with the housing for applying a load on the contact member in the first direction toward the cylinder.

2. The duct assembly of claim 1, wherein the damper assembly is positioned with respect to the cylinder so as to dampen deflections from anticipated modal vibrations.

3. The duct assembly of claim 1, wherein the contact member is a pin with a low friction contact pad.

4. The duct assembly of claim 1, wherein the contact member is a roller.

5. The duct assembly of claim 4, and further comprising:
a carriage positioned between the cap and the roller and having first and second posts in contact with first and second roller pins for transmitting the load from the cap to the roller.

6. The duct assembly of claim 4, wherein the housing has an inner surface with first and second slots, and wherein the roller has first and second roller pins positioned in the first and second slots, respectively.

7. The duct assembly of claim 4, and further comprising:
a spring positioned between the cap and the roller, wherein first and second roller pins can slide within first and second slots, respectively, when the spring compresses.

8. The duct assembly of claim 1, wherein the cap is threaded on its exterior surface, the housing is threaded on its interior surface, and the cap has a plurality of notches for turning the cap with respect to the housing.

9. The duct assembly of claim 1, wherein the housing has a tab extending from an outer surface of the housing, the plate has a slot, and the tab is positioned in the slot.

10. The duct assembly of claim 1, and further comprising:
a spring positioned between the cap and the contact member for biasing the contact member toward the cylinder.

11. The duct assembly of claim 10, wherein the spring is a Belleville washer spring.

12. The duct assembly of claim 1, wherein the cylinder is located concentrically with the duct.

13. The duct assembly of claim 1, wherein the plate is integrally formed with the duct.

14. The duct assembly of claim 1, wherein the plate is a separate piece attached to the duct.

* * * * *